Feb. 25, 1964   J. A. HARRISON   3,121,985
MACHINE FOR PLUGGING PIPETTES AND THE LIKE
Filed June 16, 1961   2 Sheets-Sheet 1

INVENTOR
James A. Harrison
BY
AGENT

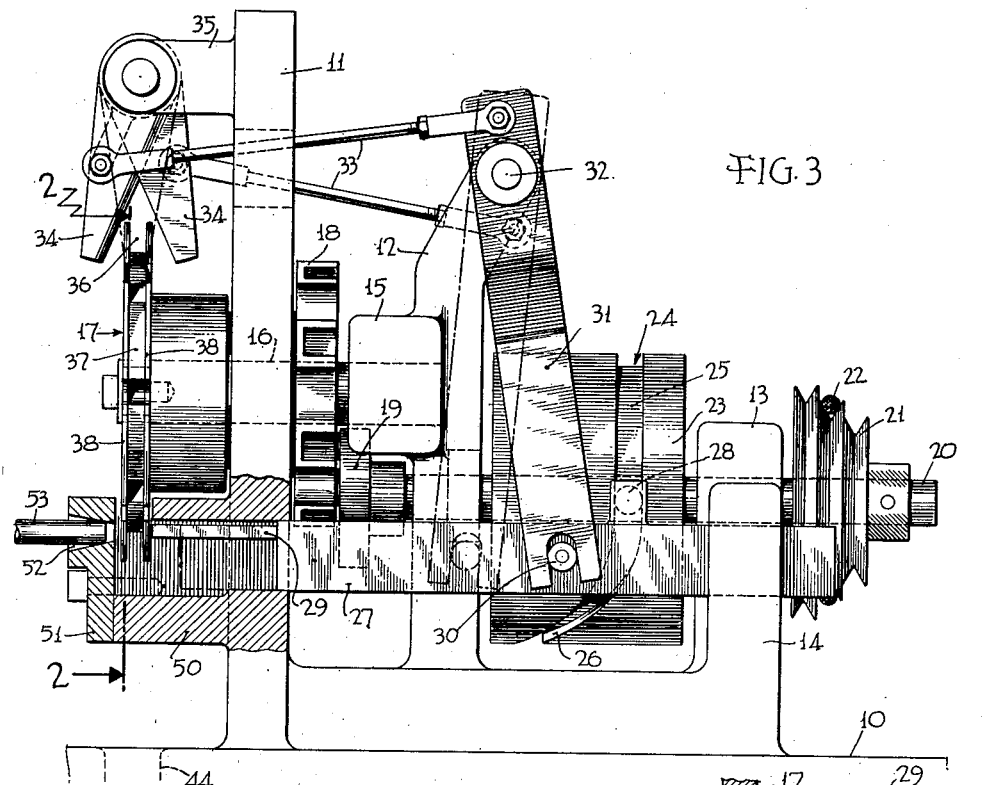
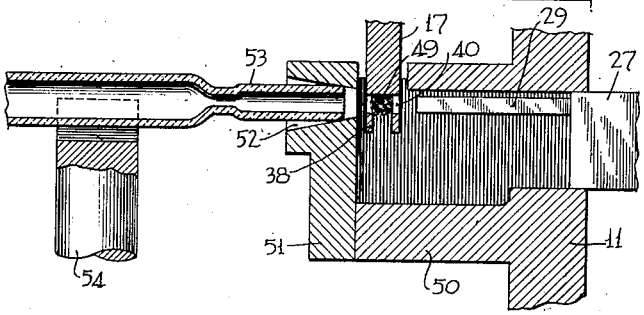
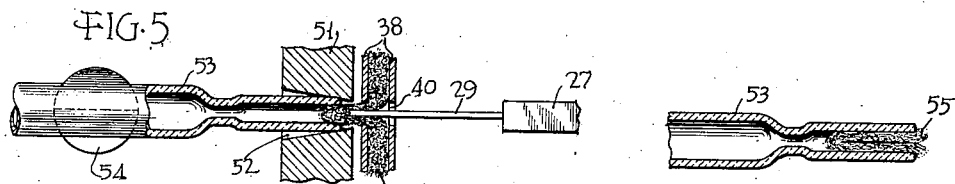
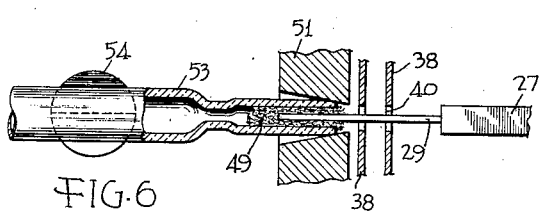
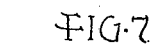

United States Patent Office 3,121,985
Patented Feb. 25, 1964

3,121,985
MACHINE FOR PLUGGING PIPETTES AND THE LIKE
James A. Harrison, 322 Wellesley Road, Philadelphia, Pa.
Filed June 16, 1961, Ser. No. 117,695
5 Claims. (Cl. 53—115)

The invention relates to machines for inserting plugs or stoppers formed of strips of soft material into the open ends of pipettes or other containers, vessels and the like.

More specifically, the invention relates to a further development, adaptation or improvement of the type of device disclosed in and forming the subject matter of United States Patent 2,764,860, issued on October 2, 1956, to applicant as co-inventor.

Among the objects of the invention are the simplification, reduction in size, increased dependability and greater adaptability to special tasks as compared with the embodiment disclosed in the aforesaid patent and with other comparable known devices such as disclosed in U.S. Patent 2,304,932 of Lakso.

Among the specific objects of the invention is a device which lends itself to the plugging of vessels, such as pipettes having ordinarily an orifice of much smaller diameter than test tubes, bottles and the like and therefore requiring much thinner and consequently more difficult to handle strips of material for the plugs or stoppers.

With these and other objects in view the novel machine comprises a disc, wheel, reel, drum or the like rotatably mounted about a substantially horizontal axis and having a circumferential, radially outwardly open groove for the reception of the plugging strip, registering recesses and openings in both walls of the groove for the passage of severing means and a reciprocating rod or blade, the latter serving for pushing a piece of the strip through one of said openings into the orifice of a pipette or the like while doubling it up, and means arranged in rear of said disc or the like for supporting and driving said disc, said severing means and said rod as well as for synchronizing the intermittent rotation of said disc, the movement of said severing means and the reciprocation of said rod, leaving the space in front of said disc free for presenting the pipette or the like to be plugged.

Further features, objects and advantages of the invention will become apparent from or be explained in connection with the embodiment of the invention illustrated in the attached drawing and described in the following.

In the drawing:

FIG. 3 is a, likewise somewhat diagrammatic side elevation of the machine, partly in section;

FIG. 4 is a fragmentary, radial section, on a larger scale along line 4—4 of FIG. 1 and through the end of a pipette, the parts being shown just before the start of the plugging operation;

FIGS. 5 and 6 are tangential, fragmentary sections along line 5—5 of FIG. 4, the parts being shown in two successive, intermediate steps of the plugging operation; and FIG. 7 is a section through one end of a pipette with a plug inserted therein.

Figure 1:
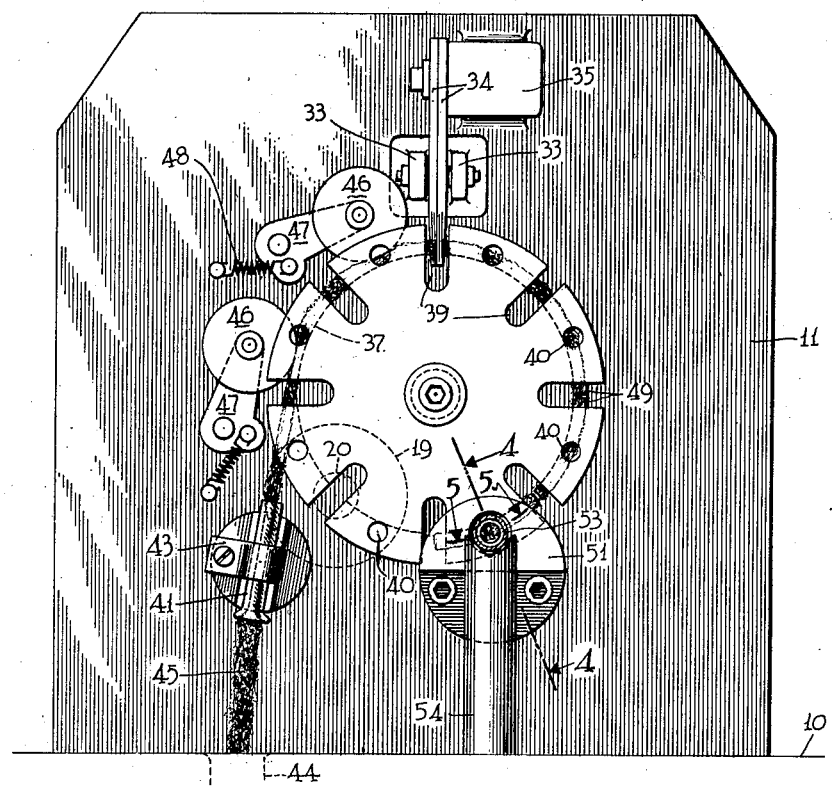
FIG. 1 is a somewhat diagrammatic end elevation of the machine.
Figure 2:
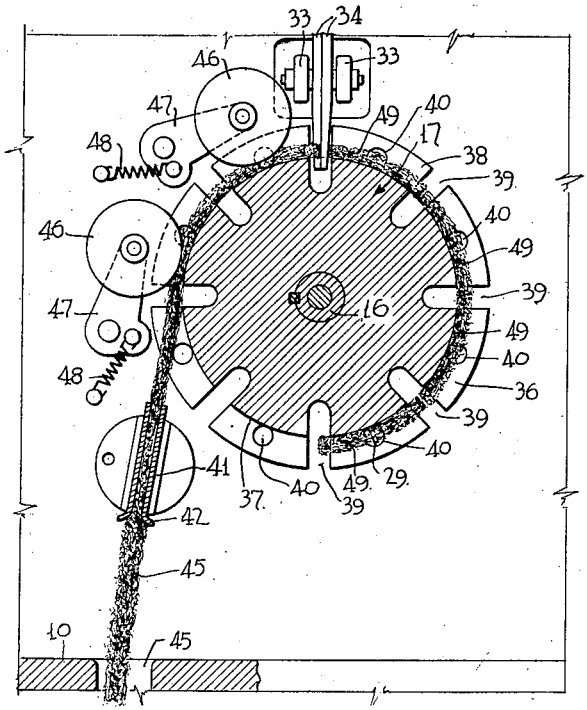
FIG. 2 is a view similar to that of FIG. 1 but more simplified by the partial or complete omission of parts and by showing other parts in section along line 2—2 of FIG. 3.

The illustrated machine or device comprises a base plate 10 rigidly connected with an upright front plate 11 and upright supports 12, 13 and 14. Rotatably mounted in plate 11 and bearing 15, the latter formed on support 12, is a shaft 16 to which is secured in front of plate 11 a drum or disc 17 and between plate 11 and bearing 15 a Geneva wheel 18 of a Geneva movement. The drive 19 of the Geneva movement is carried by one end of a shaft 20 rotatably mounted in the supports 12 and 13. The other end of shaft 20 carries a pulley 21 engaged by a belt 22, which latter is driven by a, not shown, motor.

A cam drum 23 is secured to shaft 20 between the supports 12 and 13; it is provided with a cam groove 24 having a circumferentially extending portion 25 and axially extending portion 26. A bar 27, paralleling shaft 20, reciprocably supported in plate 11 and support 14, carries a cam follower 28 engaging cam groove 24 of drum 23, has secured to its one end a push rod or blade 29 and engages at 30 one end of a lever 31, which is swingably mounted at 32 on support 12. Links 33 connect lever 31 with scissor blades 34 which are swingably mounted on a projection 35 of plate 11 and will once close and open upon each rotation of cam drum 23 and the ensuing reciprocating movement of bar 27 and lever 31.

Drum or disc 17 is formed with a circumferential, radially outwardly open groove 36 having a bottom 37 and thin side walls 38 comprising an outer or front wall and an inner or rear well. Radial slots 39, equally distributed over the circumference of disc 17, are provided for the scissor blades 34. Midway between each two slots 39, the side walls 38 provide axially extending registering holes 40 close to bottom 37 of groove 36 and at the same radial distance from the axis of disc 17 as blade or rod 29.

A tube 41, having a flared end 42, is held by a clip 43 or the like on plate 11 and extends substantially tangentially to bottom 37 of disc 17 and in line with an opening 44 in base plate 10. Tube 41 serves as guide for a continuous sliver 45 of cotton or other fibrous or soft material fed from a supply (not shown) through said opening 44. Arranged between tube 41 and scissor blades 34 are in succession two hold-down rollers 46 carried on plate 11 by levers 47 and urged toward the bottom of groove 36 by springs 48, having their ends attached to plate 11 and levers 47.

Upon threading sliver 45 through tube 41 and into groove 36 under the first roller 46 and upon rotating disc 17 in clockwise direction by belt 22 over Geneva movement 18, 19 the sliver 45 will be carried along and severed by scissor blades 34 into short pieces 49 which remain in their respective sections of groove 36 until they reach the station in front of blade 29. At this latter station, plate 11 is provided with a projection 50 which extends around a marginal part of disc 17 and has a portion 51 in front of the latter. Portion 51 presents an outwardly widening, conical opening 52 registering with the openings or holes 40 of disc 17 and serving for aligning the end of a pipette 53. A support 54 in front of portion 51 has a V-groove serving for further facilitating the axial alignment of a pipette 53 with the holes 40 and blade 29.

The operation of the machine is believed to be practically self-evident from the drawing and the foregoing description. Upon rotation of shaft 20, a step-by-step movement interrupted by periods of standstill will be imparted to disc 17. During each standstill of disc 17, the scissor blades 34 perform one cutting action and bar 27 performs one reciprocating movement. The movement of bar 27 pushes blade 29 through the holes 40 of disc 17 into the open end of a pipette 53 in doubling up and carrying along the respective severed piece 49 of sliver 45. Upon withdrawal of blade 29, piece 49 remains in the pipette which is thereby effectively and speedily plugged.

The action of push rod 29, the movement of sliver piece 49 out of groove 36 through holes 40 and 52 into the open end of pipette 53 and the completed plug 55 in the pipette are clearly illustrated by FIGS. 4 to 7.

While one embodiment only of the invention is illustrated and described, it should be understood that the invention is susceptible to modifications and adaptations, e.g. so as to accommodate different types or sizes of plugging material and/or pipettes and other devices to be plugged.

1. In a machine for doubling-up a short length of a strip of material and pushing it into the open end of a vessel so as to serve as a plug therefor, a disc rotatably supported about a substantially horizontal axis and having an axially extending bottom wall and side walls, said side walls comprising an outer wall and an inner wall projecting radially outwardly beyond said bottom wall so as to present a radially outwardly open groove adapted for receiving and frictionally holding said strip, means in about the plane of said disc for feeding said strip into said groove, means for severing said strip in said groove into short lengths, registering openings in both said side walls, a push rod guided on the side of said inner wall for reciprocating movement transversely to said side walls into, through and out of said openings so as to engage the mid-portion of one of said short lengths of strip, doubling it up while pushing it through one of said holes and into the open end of a vessel held in front of said outer wall in registry with said push rod and openings, and means for supporting and driving said disc, said severing means and said push rod being arranged on the side of said inner wall leaving the other side of said disc free for presenting the vessels to be plugged.

2. In a machine according to claim 1, a stationary member closely spaced in front of said outer wall and presenting an opening for receiving the end of a vessel in registry with said side wall openings and said push rod.

3. In a machine according to claim 2, comprising a second stationary member spaced from said first named member and presenting a groove for receiving a part of an elongated vessel at a point spaced from the latter's open end.

4. In a machine according to claim 1, a base structure, means for rotatably supporting said rotatable disc on said base structure, a shaft rotatably supported on said base structure and arranged parallel to but transversely spaced from the axis of said rotatable disc, means adapted for driving said shaft, means on said shaft and said rotatable disc adapted for alternately stopping and rotating said rotatable disc, a cam on and connected with said shaft having an axially directed cam surface, a bar extending parallel to said shaft and supported on said base structure for reciprocating movement in a direction parallel to said shaft, a cam follower on said bar engaging said cam surface, said bar carrying said push rod.

5. Machine according to claim 4, comprising a lever journaled to said base structure swingably about an axis extending transversely to said shaft and bar, a swivel connection between said bar and one end of said lever, a pair of scissor blades journaled to said base structure for severing said strip, a pair of links, each link being journaled to said lever and one of said blades.

References Cited in the file of this patent

UNITED STATES PATENTS

| | | |
|---|---|---|
| 2,304,932 | Lakso | Dec. 15, 1942 |
| 2,764,860 | Harrison et al. | Oct. 2, 1956 |
| 2,895,273 | Lakso | July 21, 1959 |